Figure 1:
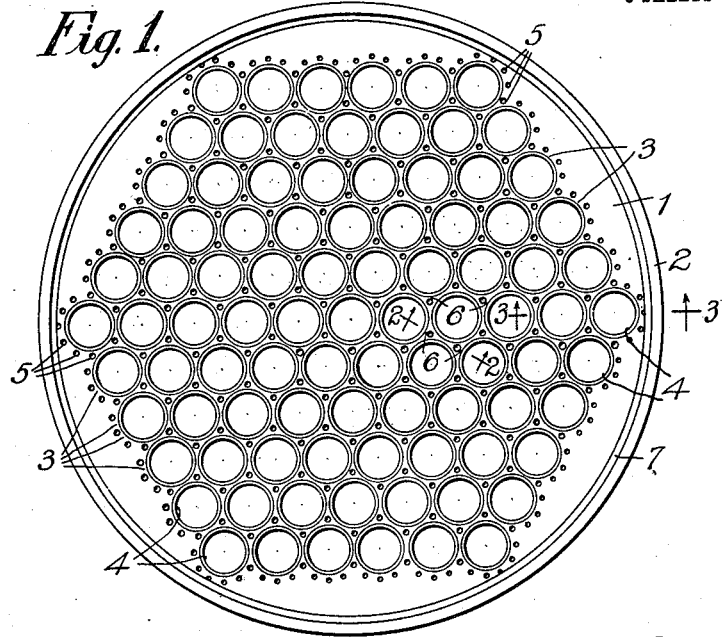

W. H. WINSLOW.
BOILER.
APPLICATION FILED MAY 16, 1910.

1,046,132.

Patented Dec. 3, 1912.
3 SHEETS—SHEET 1.

Witnesses:
Leonard W. Novander.
George E. Higham.

Inventor
William H. Winslow
By Brown & Williams
Attorneys

W. H. WINSLOW.
BOILER.
APPLICATION FILED MAY 16, 1910.
1,046,132.
Patented Dec. 3, 1912.
3 SHEETS—SHEET 2.
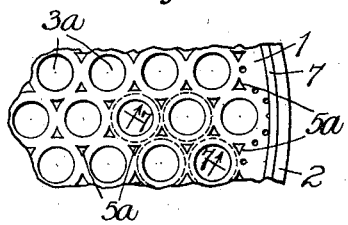
Fig. 6.
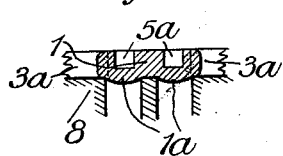
Fig. 7.
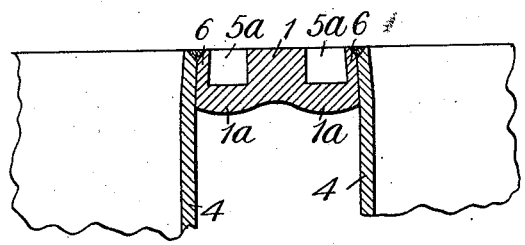
Fig. 8.
Fig. 9.
Fig. 10.
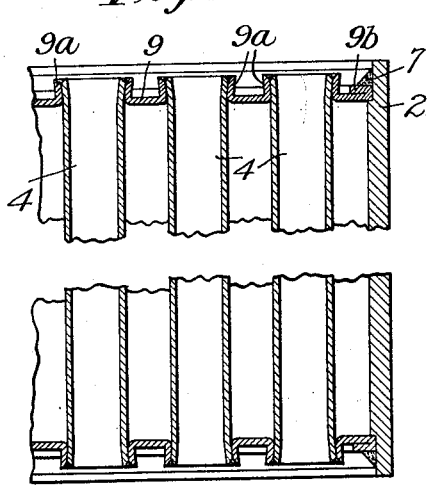
Witnesses:
Leonard W. Novander.
George C. Higham.
Inventor
William H. Winslow
By Brown & Williams
Attorneys W. H. WINSLOW.
BOILER.
APPLICATION FILED MAY 16, 1910.
1,046,132.
Patented Dec. 3, 1912.
3 SHEETS—SHEET 3.
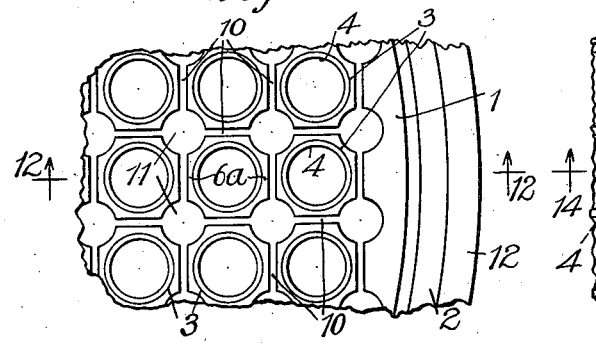
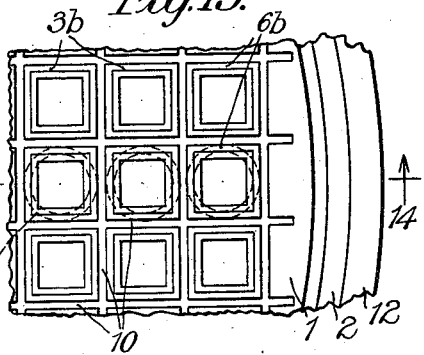
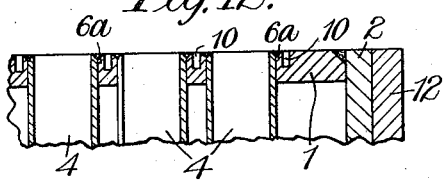
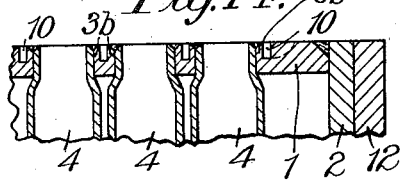
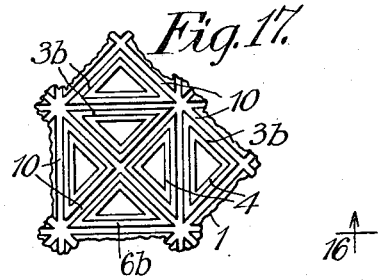
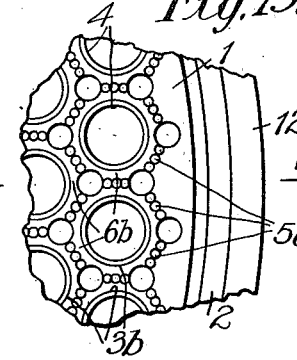
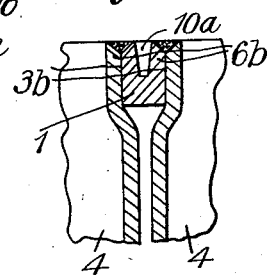
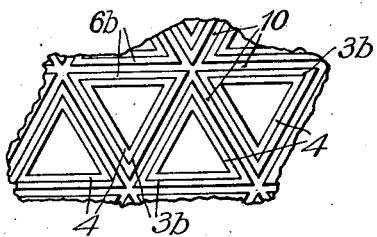
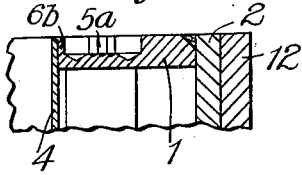
Witnesses:
Inventor
William H. Winslow
By Brown Williams
Attorneys

UNITED STATES PATENT OFFICE.

WILLIAM H. WINSLOW, OF CHICAGO, ILLINOIS, ASSIGNOR TO THE STEAM POWER DEVICES COMPANY, OF CHICAGO, ILLINOIS, A CORPORATION OF ILLINOIS.

BOILER.

1,046,132.

Specification of Letters Patent. Patented Dec. 3, 1912.

Application filed May 16, 1910. Serial No. 561,643.

*To all whom it may concern:*

Be it known that I, WILLIAM H. WINSLOW, a citizen of the United States, residing at Chicago, in the county of Cook and State of Illinois, have invented a certain new and Improved Boiler, of which the following is a full, clear, concise, and exact description, reference being had to the accompanying drawings, forming a part of this specification.

My invention relates to an improvement in boiler construction which is particularly applicable for small boilers used for the purpose of producing steam rapidly and under high pressure.

My improved construction is particularly valuable in connection with boilers that must be made as light as possible and at the same time have sufficient mechanical strength to withstand not only high boiler pressure but also hard usage to which boilers are frequently subjected by inexperienced operators, as for example in automobile work.

By my invention I secure the several parts of the boiler together by means of fusion produced by the oxy-acetylene flame, since it has been found by experience that connections when properly made in this way are more secure than those produced by other means heretofore employed. The difficulty that has been experienced in the past is to produce a boiler made of such thickness that it may readily be fused to the ends of the comparatively thin flues employed while the head at the same time is thick enough to be properly fused to the shell of the boiler. It has been found by experimentation that the best results are secured when the metals fused together by means of the oxy-acetylene flame are of practically the same thickness. While the theory accounting for this has not been definitely established, it is thought that it may be due to this condition providing paths of equal conductivity in the two metals to be joined so that both metals are brought to the melting point at the same time and therefore perfect union occurs between the two.

By my invention I provide a construction of boiler head such that the material disposed around the ends of the flues is of substantially the thickness of the flues, while the periphery of the head is of substantially the same thickness as the portion of the shell engaging such periphery wihch portion is preferably considerably thicker than the walls of the boiler flues.

In carrying out my invention the ends of the flues may be left round if desired and the material of the head may be so disposed as to constitute in effect flanges around the ends of the flues in any of the ways described below, or the ends of the flues may be made of polygonal conformation to engage correspondingly formed holes in the head, any particular polygon being employed that will facilitate the making of the holes in the head in such relation as to make the formation of the flanges a convenient operation without unnecessarily sacrificing the area of the head and without decreasing the number of tubes that may be assembled in the boiler.

The particular manner in which the results above described are accomplished, as well as other features involved in my invention are more clearly shown in the drawings in which—

Figure 2:
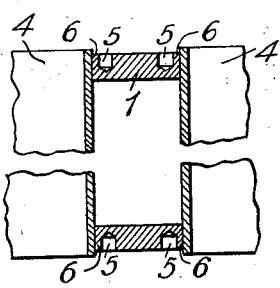
Figure 3:
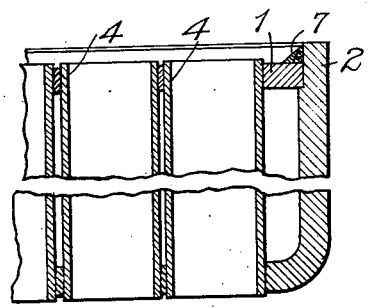
Figure 4:
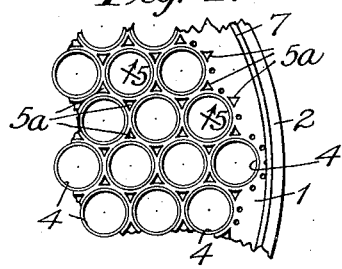
Figure 5:
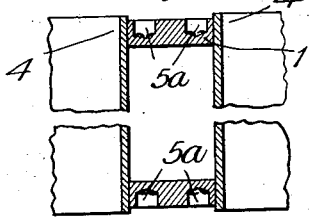

Figure 1 is a plan view of the boiler showing a head having small holes drilled in its outer surface around the ends of the boiler flues to remove a part of the material between the flues. Fig. 2 is a sectional view of a portion of the construction shown in Fig. 1 taken along the line 2—2. Fig. 3 is a sectional view of a portion of the construction shown in Fig. 1 taken along the line 3—3, and in this construction the lower head is shown as formed integrally with the boiler shell. Fig. 4 shows in plan view similar to Fig. 1 a portion of the boiler head, the boiler flues and the shell, the small holes in the head between the flues having been cut out by means of a suitable punch so as to be substantially parallel with the openings formed in the head for the flues. Fig. 5 is a sectional view of a portion of the parts shown in Fig. 4 taken along the line 5—5. Fig. 6 shows in a view similar to Fig. 4 a modified construction by which the triangular shaped openings between the flues are formed by means of suitable punches without first drilling these openings. Fig. 7 is a sectional view of a portion of the construction shown in Fig. 6 taken along the line 7—7. Fig. 8 is an enlarged view, similar to Fig. 5 showing the ends of the flues and the adjoining flanges of the head expanded in addition to being fused together. Fig. 9 is a view similar to Fig. 6 showing a head constructed of sheet metal having flanges formed around the ends of the flues by means of suitable dies, the edge of the head being properly reinforced to engage the end of the boiler shell. Fig. 10 is a sectional view of the parts shown in Fig. 9 taken along the line 10—10. Fig. 11 is a view similar to Fig. 4 showing the flues so disposed in the head that channels may be cut between them part way through the head and enlarged clearance openings formed at the intersections of such channels. Fig. 12 is a sectional view of the parts shown in Fig. 11 taken along the line 12—12. Fig. 13 is a view similar to Fig. 11 the difference being that the ends of the flues are squared and the openings through the head are similarly conformed thus doing away with the necessity for the enlarged openings at the intersections of the channels, as shown in Fig. 11. Fig. 14 is a sectional view of the parts shown in Fig. 13 taken along the line 14—14. Fig. 15 is a view similar to Fig. 11 showing channels in the boiler head between the ends of the flues resulting from drilling a plurality of holes in the surface of the head as indicated. Fig. 16 is a sectional view of the parts shown in Fig. 15 taken along the line 16—16. Fig. 17 shows a modified arrangement of a boiler head for the reception of flue ends of polygonal conformation, the channels in the surface of the head being cut in this case as shown in Fig. 13 and also diagonally across the squares thus formed. Fig. 18 shows a modified construction of boiler head in which the flue ends are formed of triangular cross section, such triangles being equiangular, as a result of which the channels formed in the boiler head are all disposed at 60 degrees to each other. Fig. 19 shows a construction similar to that illustrated in Figs. 13 and 14, the only difference being that the channels 10$^a$ are narrower at the bottom than at the top, thus making it easier to form such channels.

Similar numerals refer to similar parts throughout the several views.

As shown in Figs. 1, 2 and 3, the boiler consists essentially of a head 1 located within the end of a shell 2, such head having formed therethrough a plurality of holes 3 through which the boiler flues 4 extend. The head 1 has formed therein between the flues and surrounding the same a plurality of small drilled holes 5 which in effect leave a wall of metal 6, as shown in Fig. 2 surrounding the ends of the tubes 4 and of substantially the same thickness. The tubes 4 may project slightly beyond the face of the head 1 or may be left flush with the outer face of the head 1 as desired and are fused to the head by means of the oxy-acetylene flame. In order to more perfectly form the flanges 6 the drilled holes 5 may be somewhat enlarged as shown in Fig. 4 at 5$^a$ by means of punches forced into the holes after the drilling operation, the effect being to make the sides of the holes 5 practically parallel with the holes 3 through the head 1. The punching operation referred to serves to force some of the metal into the bottom of the holes 5$^a$ as indicated in Fig. 5. Whether the holes are drilled as shown at 5 or punched as shown at 5$^a$ they are in no event to pass entirely through the head 1 but are stopped a sufficient distance from the inner face of the head to leave the latter sufficiently strong to resist the pressure developed in the boiler. The head 1 is of substantially the thickness of the portion 2 of the shell engaged thereby and is held in position in the shell by fusion by means of the oxy-acetylene flame and to make the joint doubly secure additional material may be fused into the corner between the head and shell from a suitable sealing stick or wire to form a fillet of the material as indicated at 7 in Fig. 3. The other head of the boiler may be similar to the head 1 or it may be formed integrally with the shell 2 as desired, the latter construction being indicated in Fig. 3.

The head 1 may be constructed without drilling the holes 5 if desired as follows: The first operation is to drill through the head the holes 3$^a$ somewhat smaller than the finished holes 3 that are to receive the boiler flues and after this has been done triangular punches are employed to force from the outer surface of the head 1 enough of the material of the head to leave the triangular holes 5$^a$ above referred to. The relation of the head 1 to the die 8 employed in this operation is indicated in Fig. 7 in which it will be seen that the metal of the head is forced inward at the bottoms of the punched holes beyond the inner surface of the head and that it is also forced sidewise a certain amount into the holes 3$^a$. After the punching operation the holes 3$^a$ are drilled out to a proper size to receive the ends of the flues 4. The portions 1$^a$ of the head projecting inside of its inner surface as a result of the punching operation serve to strengthen the head rather than weaken it.

As shown in Fig. 8, the tubes 4 after being placed in the head 1 may be expanded before the operation of fusing the flues to the head and the expanding operation serves not only to expand the ends of the tubes but also the surrounding flanges 6 as a result of which the enlarged ends of the flues receive partly or wholly the outward thrust exerted upon the head 1 by the boiler pressure developed. For this construction the fusing operation serves principally to seal the joints between the ends of the flues and the boiler head, and the construction resulting is more secure therefore than it is if the fused portions are depended upon to stand the outward thrust referred to.

In the modification shown in Figs. 9 and 10 the head 9 is made of sheet metal and is constructed by first forming in a circular sheet a plurality of holes smaller than the outer diameter of the flues and spaced as the flues are to be spaced in the boiler. By means of suitable forming dies flanges are then turned outward from the holes as indicated at 9ª the inside diameter of the circular flanges thus formed being of a proper size to receive the ends of the flues 4. The flues may then be expanded and secured in place as above described. In order to secure a periphery of thicker material than the body portion of the head 9 the edge of the circular sheet may be folded over upon itself as shown at 9ᵇ by means of suitable dies after which the head is finished around the edge to fit into the end of the shell 2 in which position it is secured by fusion as above described. In this modification the head 9 is of approximately the same thickness as the walls of the flues 4.

As shown in Figs. 11 and 12 the head 1 may have the holes 3 disposed in rows at right angles to each other instead of being staggered as indicated in the modifications above described, the flues 4 being secured in the head as already indicated. In this modification channels 10 are cut part way through the head 1 in each direction between the rows of flues 4 such channels being of a width to leave flanges 6ª of substantially the thickness of the walls of the tubes 4. The portion of the head 1 at the intersection of the channels 10 is also removed by drilling holes 11 of suitable size in order that the flanges 6ª may be of practically uniform cross section around the flues 4.

In the modification shown in Figs. 13 and 14 the ends of the flues 4 which are of circular cross section are squared and are inserted in square holes 3ᵇ arranged in rows at right angles to each other as are the holes 3 in Fig. 11. Channels 10 are cut in the outer face of the head 1 between the ends of the flues 4 and since the ends are square these channels may readily be so conformed as to leave flanges 6ᵇ of the same thickness as the material of the flues such flanges being of uniform cross section around the ends of the flues. As a result of the arrangement of the flues in the head and the conformation of such ends above described, the cutting of the channels 10 is the only operation required to make the flanges 6ᵇ. The channels 10 may preferably be made by means of a milling cutter of the proper thickness.

In the modification shown in Figs. 15 and 16 the material of the head 1 is shown as removed from between the ends of the flues 4 by drilling rows of holes 5ª between the ends of the flues 4, the holes at the intersections of these rows of holes 5ª being of larger diameter to leave walls of metal around the ends of the flues which are practically of the same thickness as the material of the flues. This construction makes possible any desired arrangement of the flues relatively to each other and does not necessitate that the flues be arranged in rows at right angles to each other as shown in Figs. 11 and 13 or that the flues be disposed as close together as shown in Figs. 1 and 4.

It is to be understood that the ends of the flues may be given any polygonal conformation that will afford such an arrangement of holes in the head 1 that the sides of the holes from uninterrupted straight lines across the face of the head. This result is desirable in order that the flanges surrounding the ends of the flues may be formed by cutting continuous channels in the face of the head without any additional operation to form such flanges.

In Figs. 17 and 18 two other arrangements are shown, the one in Fig. 17 resulting from cutting channels in the head 1 at right angles to each other as indicated in Fig. 13 and then cutting other channels diagonally across the squares thus formed, the result being the formation of flanges in the form of right angle triangles, the ends of the flues being similarly formed to enter corresponding holes bounded by such flanges. The arrangement shown in Fig. 18 is similar the only difference being that the channels are so cut in the head 1 that they are all inclined at an angle of sixty degrees to each other and therefore the flanges thus formed and the ends of the boiler flues contained within the flanges are in the form of equilateral triangles.

In any of the above modifications the ends of the flues and the flanges surrounding them may if desired be expanded so as to relieve the fused joints between the ends of the flues and such flanges of the outward thrust exerted upon the boiler head by the pressure developed in the boiler.

In the construction shown in Figs. 11 to 16 inclusive a reinforcing shell 12 is shown surrounding the shell 2 of the boiler. When it is desired to employ such a reinforcing shell, it is to be understood that the shell 2 is first secured to the head 1 by fusion in order that the masses of metal heated by the fusing flame may be equally affected thereby, as a result of which both are brought to the fusing point at the same time and after the parts are properly fused together the reinforcing shell 12 is shrunk on to afford additional strength to the boiler structure.

In the construction indicated in Fig. 19 the channels 10ª are formed by means of a V-shaped cutter, which results in channels which are wider at the top than at the bottom. This affords a more convenient operation for the milling cutter, since the saws used to form the channels 10 having parallel sides frequently bind and heat more or less in use.

From the above it will appear that the boiler structure described above comprises a plurality of originally separate parts which, by the fusing operation, are so joined together that the steel of which the boilers are made is continuous throughout, and in the claims which form a part of this application I employ the term integral to refer to the parts thus united to designate the structure thus formed, meaning thereby that the parts are so joined that the metal is continuous from one part to another and the structure produced is substantially homogeneous throughout.

It is to be understood that other constructions than those described above may be employed for carrying out my invention. I therefore desire to claim any equivalents that may suggest themselves to those skilled in the art.

What I claim is:

1. In a boiler, the combination of a head, and flues extending through the head, such head having flanges formed thereon around the flues of substantially the thickness of and fused to the flues.

2. In a boiler, the combination of a head, flues extending through the head, such head having flanges formed thereon around the flues of substantially the thickness of and fused to the flues, and a shell secured to such head, the engaging portions of the head and shell being of substantially the same thickness and fused together.

3. In combination, a boiler head having holes formed therethrough, flues extending through and fused to the head, and projections from the body portion of the head around the ends of the flues of substantially the same heat conductivity as the flues.

4. In combination, a boiler head having holes formed therethrough, flues extending through and fused to the head, and projections from the body portion of the head around the end of the flues, each of such projections having substantially the same heat conductivity as the flue it surrounds.

5. In a boiler, the combination of a head, and tubes having their ends in holes through the head said parts together constituting an integral structure.

6. In a boiler, the combination of a steel head, and steel flues having their ends in holes through the head said parts together constituting an integral structure.

7. In a boiler, the combination of a head, a shell, and flues having their ends in holes through the head, said parts together constituting an integral structure.

8. In a boiler, the combination of a steel head, a steel shell, and steel flues having their ends in holes through the head, said parts together constituting an integral structure.

9. A boiler structure comprising wrought metal tubes, a head surrounding the ends of the tubes and having flanges engaging the tubes, and a shell engaging the head, said parts together constituting an integral structure.

In witness whereof, I have hereunto subscribed my name this 14th day of May, A. D. 1910.

WILLIAM H. WINSLOW.

Witnesses:
CHARLES A. BROWN,
ALBERT C. BELL.